Patented Nov. 14, 1939

2,179,977

UNITED STATES PATENT OFFICE 2,179,977

PROCESS FOR THE MANUFACTURE OF LEVO-ASCORBIC ACID

Franz Elger, Basel, Switzerland, assignor to Hoffmann-La Roche Inc., Nutley, N. J., a corporation of New Jersey No Drawing. Application November 7, 1936, Serial No. 109,794. In Switzerland November 26, 1935

5 Claims. (Cl. 260—344)

The physiologically important levo-ascorbic acid has recently been prepared synthetically from levo-xylosone (=levo-lyxosone) by reaction with prussic acid followed by acid saponification. It was identical with the natural body and proved to be biologically active vitamin C (United States Patent No. 2,056,126; Helvetica Chimica Acta vol. 16, 1933, page 1019).

This first process has the advantage of being generally applicable; it has so far in all investigated cases yielded the corresponding 3-keto-acids or their anhydrides. For the preparation of levo-ascorbic acid in particular, however, there is the disadvantage that the starting material, levo-xylosone, is obtainable only with difficulty and by expensive means. The search for a technically better method has led to the discovery of another way. According to this new method levo-ascorbic acid is obtained by treating 2-keto-levo-gulonic acid, in some cases after previous esterification, first with alkaline agents suitable for enolization and then with strong acids (Swiss Patent No. 174,208). Instead of with alkaline agents the transformation of the 2-keto-levo-gulonic acid may be carried out by heating at an acid reaction (Swiss Patent No. 180,810). The heating of the 2-keto-levo-gulonic acid or its derivatives which are easily split with acids is performed in aqueous or alcoholic solution.

It has now been found that it is particularly advantageous to carry out the transformation of the 2-keto-levo-gulonic acid and its derivatives which are easily split with acids in the presence of inert diluents, such as chloroform and the like.

Example 1

In a mixture of 200 parts by volume of chloroform and 37.5 parts by volume of ethyl alcohol (94%) 6 parts by weight of gaseous hydrogen chloride are dissolved, then 100 parts by weight of diacetone-2-keto-levo-gulonic-acid-hydrate are added and boiled for 50 hours under reflux with stirring. The diacetone-keto-gulonic acid first goes into solution, but after a few hours the separation of the difficultly soluble ascorbic acid contained in the mixture of chloroform and alcohol already begins. After the time mentioned it is filtered off and washed with a mixture of chloroform and alcohol, 52 parts by weight of ascorbic acid being thus obtained. By titration with iodine the purity of this product is shown to be 96–97%. The yield, therefore, amounts to more than 80% of the theoretical. Only small quantities of ascorbic acid are contained in the dark-coloured mother liquor.

Example 2

35 parts by weight of 2-keto-levo-gulonic-acid-methyl-ester are boiled for 70 hours while stirring under reflux in a mixture of 80 parts by volume of chloroform and 20 parts by volume of 15% alcoholic hydrogen chloride. 20.5 parts by weight of ascorbic acid are obtained of a purity of 97.3%, determined by titration with iodine.

It will be noted that in each of these examples the conversion of the keto-levo-gulonic acid compound to levo-ascorbic acid is carried out in a solution formed by a mixture of two solvents, one of which is a good solvent for the levo-ascorbic acid, while the other is a poor solvent. I have found that such a mixture of solvents results in an increased yield of levo-ascorbic acid.

I claim:

1. A process for the manufacture of levo-ascorbic acid, which comprises heating a substance selected from the group consisting of 2-keto-levo-gulonic acid and derivatives thereof which are easily split with acids, in a solution having an acid reaction and comprising as the solvent a mixture of a liquid in which levo-ascorbic acid is easily soluble and chloroform.

2. A process for the manufacture of levo-ascorbic acid, which comprises heating 2-keto-levo-gulonic acid methyl ester, in a mixture of a liquid in which levo-ascorbic acid is easily soluble and chloroform, with hydrochloric acid.

3. A process for the manufacture of levo-ascorbic acid, which comprises heating diacetone 2-keto-levo-gulonic acid hydrate in a mixture of a liquid in which levo-ascorbic acid is easily soluble and chloroform, with hydrochloric acid.

4. A process for the manufacture of levo-ascorbic acid, which comprises heating a substance selected from the group consisting of 2-keto-levo-gulonic acid and derivatives thereof which are easily split with acids, in a mixture of ethyl alcohol and chloroform, with an acid.

5. A process for the manufacture of levo-ascorbic acid, which comprises heating a substance selected from the group consisting of 2-keto-levo-gulonic acid and derivatives thereof which are easily split with acids, in a mixture of ethyl alcohol and chloroform, with hydrochloric acid.

FRANZ ELGER.